United States Patent Office 3,388,896
Patented June 18, 1968

3,388,896
OIL CIRCULATING DEVICE FOR PREVENTING SEDIMENTATION IN OIL STORAGE TANKS
Axel Mentor Isaksson, P.O. Box 77, Arjang, Sweden
Filed Mar. 3, 1967, Ser. No. 620,397
8 Claims. (Cl. 259—95)

ABSTRACT OF THE DISCLOSURE

A pump unit located at the bottom of an oil storage tank and with its outlet inclined downward toward the tank bottom. The pump unit is revolvable around a vertical axis and keeps the oil circulating in the tank to prevent sedimentation.

---

When storing oil, especially thick oil, in tanks or reservoirs, it is desirable to keep the oil in movement in order to prevent sedimentation in the tank. Various arrangements have been proposed for this purpose, such as mechanical stirrers, but these tend to be heavy and expensive and necessitate complicated bearing arrangements through the tank walls. Blowing air through the oil will oxidize the oil, and using another gas for blowing will be comparatively expensive. Safety requirements prevent using electrically driven stirrers in oil tanks.

An object of the present invention is to provide a device for stirring oil, which does not shown the drawbacks above and which in a simple and safe manner can maintain circulation of the oil to prevent sedimentation.

According to the invention, one or more pumping devices are arranged in the oil tank in order to impart necessary movement to the oil. Each pump is driven by a hydraulic motor and is arranged in such a way in the oil tank that the direction of the fluid stream leaving the pump is variable.

Figure 1:
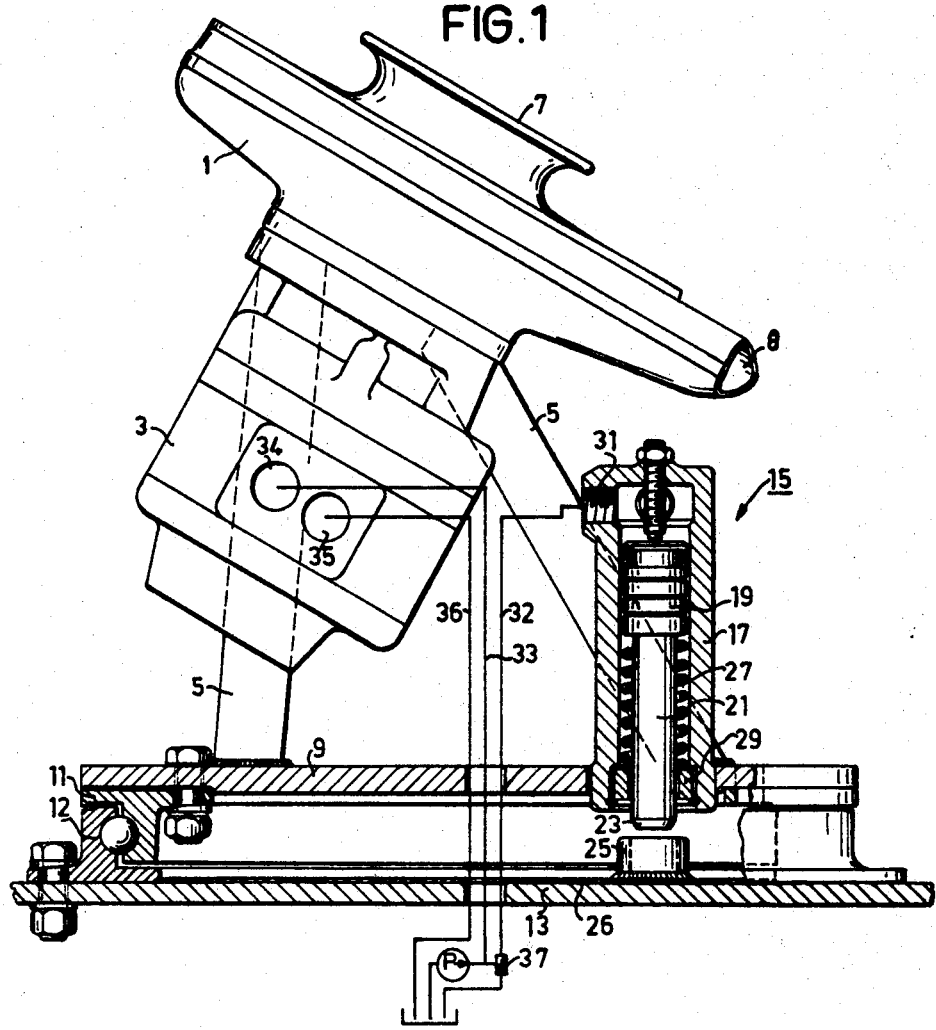
Figure 2:
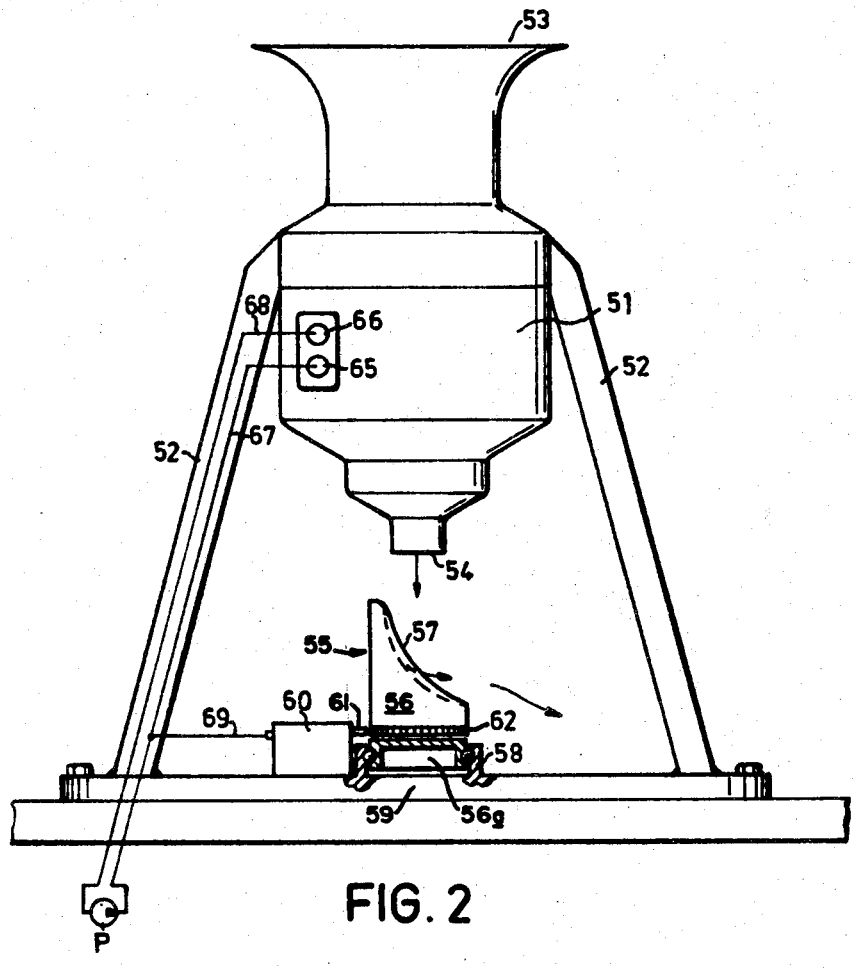

Further features of the invention will become apparent from the following detailed description taken in connection with the accompanying drawing, where FIG. 1 shows a preferred embodiment comprising a turbine pump, driven by a hydraulic motor and with a revolving device for the pump shown in vertical section, and FIG. 2 shows a second embodiment with a vertically arranged fixed pump having movable deflector means adjacent its outlet.

FIG. 1 shows a turbine casing 1 for an axial turbine, which is driven by a hydraulic motor 3. The hydraulic motor 3 is rigidly connected to the turbine casing 1, which in turn is rigidly connected to a stand or foundation 5 in such a manner, that the turbine axis assumes an inclined position. The inlet 7 of the turbine is located in the upper part of the turbine casing 1, whereas the outlet 8 of the turbine faces downwards and emits a jet of oil in a direction inclined towards the bottom of the oil tank. The stand 5 is fastened to a plate or turntable 9. The turntable 9 is mounted on the inner bearing race 11 of a ball bearing and is thereby free to rotate around a vertical axis. The other bearing race 12 of the ball bearing is fixed to the bottom 13 of the oil tank.

In the embodiment shown the turntable 9 is provided with a locking mechanism 15 for preventing turning of the turntable. The locking mechanism 15 comprises a hydraulic cylinder 17, which is fastened to the turntable 9 and contains a reciprocable piston 19, which has a piston rod 21 extending down through an opening in the turntable 9. The end of said piston rod 21 is arranged to form a locking bar 23 engageable in sockets 25 or the like locking members located either on the bottom 13 of the tank or on a plate 26 forming the bottom of the fixed race 12 of the ball bearing.

A compression spring 27 is arranged between a seat 29 in the lower part of hydraulic cylinder 17 and the lower face of piston 19. Said spring 27 exerts an upwards force on piston 19 tending to pull locking bar 23 out of its engagement with said socket 25.

In the embodiment shown, a plurality of locking sockets 25 are arranged in a circle below the turntable 9. The upper end of hydraulic cylinder 17 is provided with one or more connections 31 through which hydraulic fluid is supplied from a fluid pressure source P outside the oil tank through conduit 32 to cylinder 17 to exert pressure on the upper face of the piston 19. Piston 19 is thereby forced downwards in cylinder 17 and the locking bar 23 engages one of the sockets 25. In this way, the turntable 9 and thereby also the turbine 1 is locked immovably to the bottom 13 of the oil tank.

When it is desired to commence circulating the oil in the tank, hydraulic fluid under pressure is supplied from a hydraulic pump P outside the oil tank through conduit 33 to a fluid connection 34 on said hydraulic motor 3. The fluid is returned from motor outlet 35 through a return conduit 36 to the exterior of the oil tank. These conduits, as well as conduit 32, are shown extending through revolvable fittings in the center of the turntable 9. The hydraulic motor 3 starts rotating and drives the turbine pump, which draws in oil through its inlet 7 and forces a jet of oil through its outlet 8 in a direction downwardly towards the bottom of the oil tank. Hereby the oil in the tank is caused to circulate, and any sediment on the tank bottom will be stirred up. The pump means consequently have substantially the same efficiency irrespective of the depth of the oil tank. In order that not always the same spot on the tank bottom shall be subjected to the oil jet from the turbine pump, this jet can be given different directions by revolving the entire pump with the aid of turntable 9. This revolving action is accomplished in the embodiment shown by a valve 37 interrupting the hydraulic pressure to locking mechanism 15. Spring 27 then pushes the piston 19 upwards in cylinder 17 so that the locking bar 23 is disengaged. Due to the reactive force from the oil jet expelled through the outlet of the pump the whole pump means is caused to revolve. Pressure is then applied to piston 19 so that locking bar 23 is forced downwards and engages the next socket 25 in the circumferential direction, whereby the revolving motion of the pumping means is brought to halt.

Various other arrangements are alternatively possible for accomplishing the revolving motion of foundation 5 and turntable 9. As an example, locking mechanism 15 could be replaced by a stepping mechanism, which engages a fixed gear ring or the like below turntable 9. With the aid of impulses supplied from outside the oil tank said turntable 9 could thereby be stepped forward in the desired manner. It would also be possible to combine such an arrangement with the supply of hydraulic fluid to the hydraulic motor 3 in such a manner that only one pressure conduit and one return conduit would be required for both of these movements. Alternatively, it is possible to drive turntable 9 with a rotary motor.

FIG. 2 shows another embodiment according to the invention. In this embodiment, an axial flow hydraulic pump 51 is mounted in a fixed position with the vertical axis on a stand 52, such as a tripod. Said pump 51 has an upper inlet 53 and a lower outlet 54, through which an oil jet is ejected on to a deflector device indicated generally at 55.

This deflector device consists of a revolvable upper member 56 having a spoon-like recess 57 on one side and a lower revolvable member 56A affixed to said upper revolvable member 56. Said lower member 56A comprises the inner bearing of a ball bearing and is thereby free to rotate with member 56 around a vertical axis. The outer bearing race 58 of the ball bearing is fixed to the bottom plate 59 of the pump means. The recess 57 has such a shape as to deflect the vertical oil jet from pump outlet 54 and give it a downwardly inclined direction, as indicated by the arrows.

The deflector device 55 is further provided with a hydraulically actuated stepping mechanism 60. When hydraulic pressure is supplied to this mechanism 60, a plunger 61 is extended and engages a gear ring 62 on the lower part of member 56 and advances member 56 one step in a circumferential direction. The hydraulic pump 51 has a hydraulic fluid inlet 65 and an outlet 66, from which supply and return conduits 67 and 68, respectively, are drawn along one tripod leg 52 and to a pump P outside the oil tank. A conduit 69 is connected to supply conduit 67 and leads to stepping mechanism 60.

In operation, pump 51 forces jet of oil onto member 56, where the jet is deflected by recess 57 and receives a downwardly inclined direction, thereby stirring any sediment on the tank bottom while maintaining circulation in the oil. When it is desired to change the direction of the oil jet, the hydraulic fluid supply in conduit 67 is momentarily interrupted. Plunger 61 is then retracted by an internal spring in mechanism 60. When hydraulic pressure is again applied to mechanism 60, plunger 61 advances and engages the next tooth in the gear ring 62 in ratchet fashion, thereby causing member 56 to rotate one step.

In this embodiment, there are no revolvable hydraulic fittings such as are necessary in the embodiment of FIG. 1, and only two hydraulic conduits are required to the entire pumping device.

In the embodiment described above the device is hydraulically driven. As an alternative thereto or in combination therewith other means of driving are possible, e.g. pneumatic drive or mechanical drive, and even manual operation for accomplishing the movement involved in changing the outlet direction. When hydraulic or pneumatic drive is used it is possible to arrange a programming device which fully automatically maintains necessary circulation in the oil tank with due consideration taken to different types of oil, variations in temperature and oil level in the tank etc.

In smaller oil tanks, one single pumping device according to the invention may be sufficient to maintain necessary circulation. In larger tanks three or four devices could be arranged equally spaced in a circle on the bottom of the tank. The reason for using a plurality of small devices instead of a single large device is that improved distribution of the circulatory oil movement thereby is achieved, and also that small devices as a whole can be removed through the manhole of the tank without disassembling, thereby facilitating installation and service of the device.

What I claim is:
1. A device for bringing oil in an oil storage tank into motion in order to prevent sedimentation comprising: pump means seated at the bottom of the oil tank on a turntable which is rotatable under the reaction to the oil jet ejected by the pump outlet to thereby vary the direction of the oil stream emitted by the pump.
2. A device as claimed in claim 1 wherein said pump outlet is directed obliquely downward.
3. A device as claimed in claim 1, comprising locking means for selectively preventing revolving movement of said turntable.
4. A device as claimed in claim 3, wherein said pump is a hydraulic pump.
5. A device as claimed in claim 3, wherein said pump is a pneumatic pump.
6. A device for bringing oil in an oil storage tank into motion in order to prevent sedimentation comprising: pump means located near the bottom of the tank and having a substantially vertically downwards directed outlet, and deflector means located in the outlet stream of said pump, said deflector means being revolvable for selectively changing the direction of the oil stream leaving the device.
7. A device as claimed in claim 6, wherein said pump is a hydraulic pump.
8. A device as claimed in claim 6, wherein said pump is a pneumatic pump.

References Cited

UNITED STATES PATENTS

| 2,322,087 | 6/1943 | Atwood | 259—95 X |
| 2,965,364 | 12/1960 | Parker et al. | 259—95 |
| 2,991,983 | 7/1961 | Logan | 259—97 |

FOREIGN PATENTS 573,836   12/1945   Great Britain.

ROBERT W. JENKINS, *Primary Examiner.*